INVENTOR.
GUY N. L. J. MARECHAL
BY
[signature]
AGENT

INVENTOR.
GUY N. L. J. MARECHAL
BY
Frank R. Trifari
AGENT

INVENTOR.
GUY N.L.J. MARECHAL
BY
[signature]
AGENT

INVENTOR.
GUY N.L.J. MARECHAL
BY
Frank R. Jasfoni
AGENT

INVENTOR.
GUY N. L. J. MARECHAL
BY
Frank R. Trifari
AGENT

3,433,976
PARAMETRIC AMPLIFIER

Guy N. L. J. Marechal, Ixelles, Belgium, assignor to North American Philips Company, Inc., New York, N.Y., a corporation of Delaware Filed Dec. 5, 1967, Ser. No. 688,086
Claims priority, application Netherlands, Dec. 8, 1966, 6617222
U.S. Cl. 307—88.3 8 Claims
Int. Cl. H03f 7/02, 7/04

ABSTRACT OF THE DISCLOSURE

A parametric amplifier of the type having a plurality of differentially connected varactors and capacitors for adjusting the A.C. equilibrium of the amplifier, is provided with switches for selectively interrupting direct currents in the varactors without affecting direct currents in the other varactors or affecting alternating currents in any of the varactors. Means are also provided for selectively controlling the direct currents to the varactors. The arrangemnet permits minimizing current flow to an input source circuit that is independent of source voltage.

The invention relates to a parametric amplifier including a device by means of which the fluctuations about the zero value of the part of the input signal current which is independent of the input voltage are minimized.

A parametric amplifier of a slowly varying signal for a consumer device can be obtained in principle by a differential arrangement of a number of capacitances a few of which have a value depending upon the voltage applied. In general, semiconductors are used for this purpose which have a pn-junction and a voltage-dependent capacitance. The semiconductors are generally referred to as varactors. These capacitances are combined in a manner described below to a circuit arrangement fed on the one hand by a source of the slowly varying signal—substantially a direct-voltage—or a direct-current signal which will be referred to herein-after as input signal—and on the other hand by one or more alternating signal sources one of which has a fundamental frequency $f$ whilst the other sources have a frequency equal to a multiple of $f$. These alternating signals are not necessarily sinusoidal and may be alternating voltages as well as alternating currents. They are referred to as pump signals. It is ensured by including a given number of filters that each signal source—both of input signals and of pump signals—does not receive the signals of the other signal sources. The filters used may be series-and parallel resonant circuits as well as other decoupling means such as tranformer winding having a centre tapping. Between two output terminals, which will be referred to hereinafter as the output, the circuit arrangement supplies a not necessarily sinusoidal alternating signal having a given fundamental frequency equal to $f$ or to a multiple of $f$. By the use of corresponding filtering means, it is ensured that the output is decoupled from the input signal and from the sinusoidal components of the pump signal which should not appear in the output signal.

The manner in which the capacitances and varactors are combined together with the signal sources and filters to a circuit arrangement and in which the output terminals should be chosen is based on the following principles. For the linear capacitances, the polarity of one termianl is positive with respect to the other, whilst for the varactors, the pass direction of the pn-junction is chosen to be the positive polarity. When the linear capacitances, the signal sources, varactors and filters are joined, it is ensured that each capacitance or varactor receives all the input— and pump signals. One half of the capacitances and varactors receives the input—and pump signals with the same polarity (hence both with positive or with negative polarity), whereas the other half receives the input signal with a polarity opposite to that of the pump signals applied. The output terminals should be chosen so that an alternating voltage applied thereto is received by one half of the varactors and capacitances with one polarity and by the other half with the opposite polarity.

Suitable arrangements are known in which this differential structure can be obtained in a simple manner by means of bridge circuits or in which both the differential structure and the decoupling of the signals are obtained by means of transformers having a centre tapping. The invention can be applied to all these parametric amplifiers comprising capacitors and varactors arranged in the differential structure described above.

These arrangements operate as follows: It can be shown that each varactor behaves like a frequency voltage converter converting each pump signal applied into an alternating output signal having a frequency equal to the fundamental frequency chosen. The voltage transofrmation ratio varies in accordance with the slowly varying signal applied to the varactor. It is also shown that the output of the amplifier supplies a voltage which is equal to the sum of the converted pump signals in the varactors of the said first half minus the sum of the converted pump signals in each varactor of the other half. Each sum is based on the relative value of the converted pump signal. This value is positive if the pump signal is applied to the varactor with positive polarity and negative in the opposite case.

In the absence of an input signal, the transformation ratio of all the varactors is the same and the converted pump signals cancel each other at the output. When an input signal appears, however, the transformation ratio of the varactors receiving this signal with positive polarity increases, whereas the said ratio decreases in the varactors receiving this signal with negative polarity. As a result, the converted output signals no longer cancel each other, whilst an alternating voltage appears at the output of the amplifier which, at least for small input signals, is directly proportional to the input signal.

It is known that a varactor which receives one or more alternating voltages will pass a direct current in the conducting direction. This is due to the non-linear current-voltage characteristic. In the differential structures described above, the appearance of the pump signals will result in that the direct current passed by each varactor flows through the input signal source, but the direct current passed by the said first half of the varactors and that passed by the other half flow through the input signal source with opposite polarities. With identical current-voltage characteristics, these currents compensate each other. However, in practice this compensation is never complete and a current $I_k$ flows through the input signal source which is independent of the input signal. As will appear below, this $I_k$ is very undesirable. It is neutralized in that one or more varactors receive an adjustable direct voltage, as a result of which the direct currents passed by these varactors are adjusted so that the current $I_k$ becomes equal to zero. This direct voltage is referred to hereinafter as polarization voltage. Each varactor will further advantageously be polarized in the negative sense. Consequently the input signal will have to supply only a small current. Also due to the inequality of the capacitance-voltage characteristics of the varactors and to the adjustable direct voltage by which $I_k$ was reduced to zero, an alternating voltage will appear at the output even in the absence of an input signal. This voltage may be neutralized in that a control capacitor is arranged across one or more capacitors or varactors. These control capacitors are adjusted so that the output voltage becomes zero in the absence of the input signal.

The parametric amplifiers constructed according to the aforementioned principles are further referred to as parametric amplifiers comprising varactors in differential arrangement and control capacitors for obtaining the A.C. equilibrium at the output. These amplifiers have the advantage that they can amplify a weak direct voltage signal capable of supplying only a small current to a signal capable of supplying a large amount of energy and having a very low noise level. This low noise level is due to the fact that the circuit arrangement does not include resistive elements. Therefore, these amplifiers are particularly suitable for measuring low voltage sources having a high internal resistance. Moreover, they all have the property that the current through the input signal source is given by the formula:

$$I=I_k+\frac{V_s}{R_i} \qquad (1)$$

In this formula, $I_k$ represents the current which flows through the input signal source and is independent of the input signal, which current is due to the aforesaid causes and can be reduced to zero. This $I_k$ is better known under the name of "offset current." $V_s$ represents the terminal voltage of the input signal source and $R_i$ the input resistance which for small signals is independent of $V_s$.

A voltage source to be measured, which has an EMF value E and an internal resistance R and is connected to the input terminals of the amplifier, will have a terminal voltage $V_s=E-RI$ and be passed by the current I which is given by the Formula 1. As a result, it is found for the terminal voltage as a function of E that:

$$V_s=\frac{R_i}{R+R_i}\left(1-\frac{RI_k}{E}\right)E \qquad (2)$$

Thus, the output signal, which is proportional to $V_s$, is not directly proportional to the voltage source to be measured. Consequently, a varying voltage can never be measured, because the factor $$\left(1-\frac{RI_k}{E}\right)$$

depends upon E. Even with the use of a non-linear reading device, the calibration of this device would apply only to the measurement of the voltage of one kind of source which must have an accurately defined internal resistance; thus, the possibilities of this device would be unduly limited.

It has been stated that this disadvantage is obviated by adjusting in the amplifier polarization voltages such that $I_k$ becomes equal to zero. This is achieved by short-circuiting the input terminals and by connecting a D.C.-meter in series with this short-circuit and by subsequently adjusting the polarization voltages so that no direct current is detected any longer by the measuring devices. However, these voltages are varied in time. This zero equilibrium will also be disturbed by variation of the value of the pump voltage, and especially due to the temperature fluctuations, the value for $I_k$ will fluctuate only about the zero value. Thus, the measurement of low signal sources, i.e. sources having a high internal resistance, becomes fully unreliable.

Therefore, the invention has for an object to provide these parametric amplifiers with a device by means of which these fluctuations of $I_k$ about the zero value can be minimized.

It appears from the considerations on which the invention is based and which will be described below that these fluctuations of $I_k$ can be reduced substantially to zero, if the direct current passed by each varactor is adjusted to zero when the input terminals are short-circuited and when the pump voltage is applied. Hitherto, the adjustment of the direct currents through the varactors was only such that no current was detected any longer between the short-circuited input terminals. This does not give rise to difficulties, since due to the differential arrangement, the current between the input terminals remains zero when the current-measuring device is removed. The galvanometer may even be left in the circuit during measuring. If, however, current-measuring devices are connected in series with one or more varactors and if the currents are reduced to zero, whilst these measuring devices are subsequently removed, the configuration of the direct currents in the network will vary and the current through the input terminals is no longer equal to zero. This current would have to be made equal to zero by adjusting it to a polarization voltage; the direct current through each varactor is then again not equal to zero. If these current-measuring devices should not be removed after the adjustment, the variation of the capacitance of each varactor will only slightly influence the disequilibrium at the output, since the non-varying impedance of the measuring device is connected in series with the varactor. Thus, the circuit arrangement would not only have to include a number of galvanometers which are not used in the measurement itself, but the amplification factor would also be strongly adversely affected.

Consequently, it will be appreciated that the device must be provided with simple adjusting means which are not removed during measuring and by which the direct current through each varactor can be reduced to zero when the input terminals are short-circuited and when the pump voltage is applied. Advantageously, each detected direct current will be amplified to the optimum during the adjustment so that it is adjusted to zero with the greatest possible accuracy. The means according to the invention permit of using the parametric amplifier itself for successively adjusting each direct current. Thus, a great accuracy of the voltage measurements carried out afterwards is obtained.

According to the invention, such a parametric amplifier includes means by which the direct current through an arbitrary varactor can be interrupted without the direct currents through the remaining varactors being influenced or the A.C.-paths in the amplifiers being noticeably varied when the input terminals are short-circuited, the amplifier further including means by which, when no direct current at all is interrupted by the former means, the direct current through each individual varactor can be adjusted to zero without the direct currents through the remaining varactors being influenced or the A.C.-paths in the amplifier being noticeably varied when the input terminals are short-circuited.

According to the invention, the fluctuations of $I_k$ about the zero value in such a parametric amplifier are further reduced in that prior to the use, when the input terminals are short-circuited and pump signals are applied, the direct currents through the varactors are successively adjusted to zero, that is to say in two steps for each varactor, in the first step only the direct current through the relevant varactor being interrupted by the former means, whereupon the output signal is adjusted to zero by means of the adjusting capacitors, whilst in the second step the former means do not interrupt any direct current, whereupon the input signal is re-adjusted to zero by means of the adjustable direct current sources.

For a better understanding of the kinds of amplifiers to which the invention can be applied and of their different uses, the invention will be described more fully with reference to a few examples and a few figures.

Figure 1:
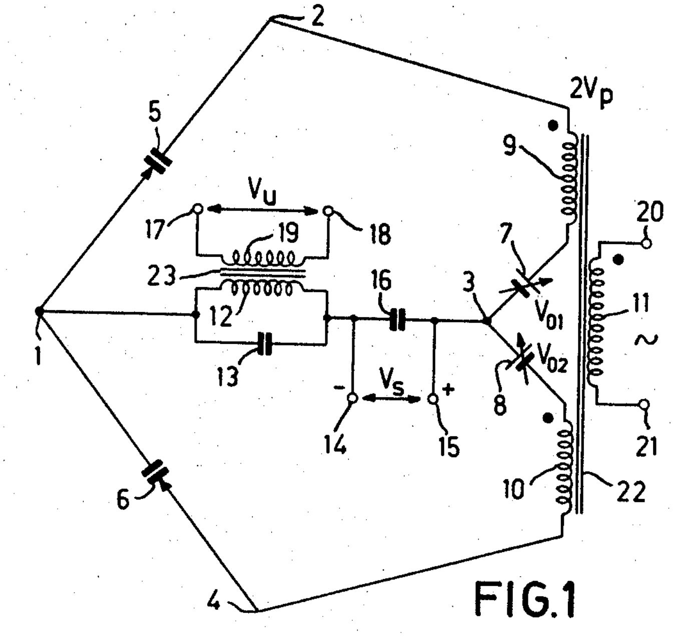
FIGURE 1 shows a bridge circuit comprising two varactors to which the invention can be applied.

FIGURE 1 shows a parametric amplifier to which the invention will be applied. This amplifier is constituted by a bridge circuit comprising four branches 1–2, 2–3, 3–4, 4–1 and the diagonal 1–3. The branches 1–2 and 1–4 each include a varactor 5 and 6, respectively. These varactors are diodes which behave as such with respect to a direct voltage at the terminals and which behave like a capacitor with respect to an alternating voltage. The value of the capacitance varies with the direct voltage, however. The branches 2–3 and 3–4 each include a secondary 9 and 10, respectively, of a transformer 22, the primary 11 of which receives at the terminals 20 and 21 a pump signal in the form of a sinusoidal voltage having a pulsation $\omega$. The secondaries have the same number of turns and are wound in the same sense, which is shown by dots in the figure. Consequently, they both supply a sinusoidal voltage the peak value of which is equal to $2V_p$, $V_p$ representing the pump voltage. The same branches 2–3 and 3–4 also each include adjustable direct voltage sources 7 and 8, respectively, also referred to as polarization source, which supply the polarization voltages $V_{o1}$ and $V_{o2}$, respectively. The input voltage $V_s$ is applied to the diagonal between the input terminals 14 and 15. This voltage is a slowly varying signal—substantially a direct voltage. The output signal $V_u$ is derived from the output terminals 17 and 18 of the secondary 19 of the transformer 23. It can be shown that the pump signal source does not receive the input voltage $V_s$ at the terminals 20 and 21 due to the D.C.-decoupling by means of transformer 22. It can also be shown that the input signal source does not receive the pump voltage at the terminals 14 and 15 due to the capacitor 16 which decouples the input signal source from the alternating current applied. It can further be shown that the output is decoupled from the input signal $V_s$ at the terminals 17 and 18 due to the D.C.-coupling by means of transformer 23 and that this output is coupled with the pump signal only for the frequency to which the LC-circuit comprising an inductance 12 and a capacitor 13 is tuned. This is the fundamental frequency of the pump signal.

If it is assumed that the varactors have accurately the same characteristics, that the secondaries 9 and 10 supply accurately the same alternating voltage and that the voltages $V_{o1}$ and $V_{o2}$ are accurately equal, the circuit arrangement operates as follows. If $V_s=0$ (short-circuited terminals 14 and 15), the direct voltage across the two varactors 5 and 6 is the same and equal to $V_{o1}=V_{o2}$. As a result, these varactors have the same capacitance. Therefore, both loops 1–2–3 and 1–4–3, which are fed by the alternating voltage $2V_p$, pass the same alternating current. In the diagonal 1–3, the two alternating currents are of opposite polarities and cancel each other so that no alternating voltage is detected at the output. If, however, $V_s$ assumes a given value, the varactor 5 receives the direct voltage $V_{o1}+V_s$ and varactor 6 receives $V_{o2}-V_s$. The capacitances of the two varactors vary in opposite senses. The alternating currents through the two loops do not cancel each other any longer in the diagonal and an alternating voltage $V_u$ having a pulsation $\omega$ appears at the output. The bridge is no longer in A.C.-equilibrium. At least for small values of $V_s$, this $V_u$ is directly proportional to $V_s$. However, the quantity of energy available at the output largely exceeds that supplied to the input. In actual fact, the output energy does not originate from the input signal but from the pump signal. Consequently, an energy-consuming alternating-voltage measuring device can be connected to the output. The A.C.-disequilibrium is already obtained for very small values of $V_s$ (of the order of microvolts). For these reasons, this amplifier is suitable for measuring very low voltage sources supplying a vary small amount of energy.

The loops both also pass a direct current. For $V_s=0$, the two currents are equal and cancel each other in the diagonal. The bridge is then in D.C.-equilibrium. However, at a given value of $V_s$, the direct-current resistance of each diode varies in the opposite sense and the bridge is no longer in equilibrium.

The source of the signal $V_s$ consequently passes a direct current I which, at least in this ideal case, depends upon $V_s$ and is approximately directly proportional thereto for small input signals:

$$I=\frac{V_s}{R_i} \qquad (3)$$

In this formula, $R_i$ represents the input resistance of the amplifier.

Figure 2:
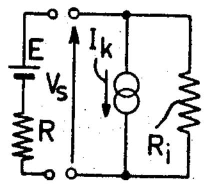
FIGURE 2 shows the equivalent circuit diagram of the parametric amplifier, viewed from the input signal source.

In this circuit arrangement, the diode characteristics are not accurately equal, however. Moreover, the voltages supplied by the secondaries 9 and 10 are not accurately equal, whilst $V_{o1}$ is not accurately equal to $V_{o2}$. As a result, no D.C.-equilibrium and no A.C.-equilibrium either is obtained for $V_s=0$. A direct current $I_k$ will flow through the diagonal 1–3 which is independent of $V_s$. With a given value of $V_s$ at the input, the current I through the diagonal will be equal to:

$$I=I_k+\frac{V_s}{R_i}$$

which corresponds to the aforesaid Formula 1. If a voltage source having an EMF-value E and an internal resistance R is connected to the input of the amplifier, the latter behaves with respect to the said source as shown in the equivalent circuit diagram of FIGURE 2. As a result, the Formula 2:

$$V_s=\frac{R_i}{R+R_i}\left(1-\frac{RI_k}{E}\right)E \qquad (2)$$

is obtained. This $I_k$ is undesirable. It is reduced to zero by setting the D.C.-equilibrium by means of one or both variable voltages $V_{o1}$ and/or $V_{o2}$ whilst $V_s=0$ (and hence the input terminals are short-circuited). This equilibrium is detected by a D.C.-meter in the diagonal 1–3. After the voltages $V_{o1}$ and $V_{o2}$ have been adjusted, this current-measuring device may be removed from the diagonal. This does not disturb the equilibrium of the bridge, since the measuring device was included in the diagonal. The only information obtained after the adjustment of the equilibrium of the bridge is that the direct currents in the two loops are equal. Their value is not indicated, however.

After this adjustment, the voltage source to be measured can be connected to the input terminals and the amplifier can continuously measure its value. After some time, however, $I_k$, which initially had been adjusted to zero, starts fluctuating about this zero value so that the measurement of voltage sources having a high internal resistance becomes fully unreliable. Consequently, these fluctuations must be eliminated as far as possible.

The idea on which the invention is based and which will be described more fully resides in the fact that these fluctuations can be predicted to be a minimum if the direct current in both loops is adjusted to zero. However, this cannot be measured by the means known hitherto. If during the adjustment a current-measuring device should be connected in a loop, the D.C.-equilibrium would be disturbed again upon removal of the current-measuring device from this loop so that a D.C.-equilibrium could never be obtained.

Figure 3:
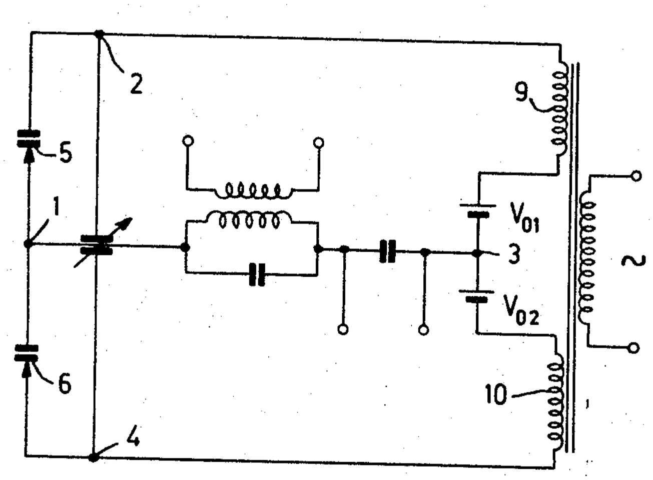
FIGURE 3 shows the same circuit arrangement as FIGURE 1, to which adjusting capacitors are added, however.

As has been stated, no A.C.-equilibrium has been obtained either for $V_s=0$. In order that the output signal $V_u$ may be directly proportional to $V_s$, this equilibrium must be set whilst the input terminals are short-circuited. This is achieved by means of two control capacitors which are connected in parallel across each varactor. These capacitors pass an alternating current which is superimposed on the alternating current flowing through the diagonal. They may be in the form of a differential capacitor, the value of both capacitors being varied in opposite senses by the same value with the aid of one control button. (FIGURE 3). Thus, the A.C.-equilibrium can readily be obtained at any instant.

The fluctuations of $I_k$ about the zero value cannot be reduced until their appearance has been accounted for.

Figure 4:
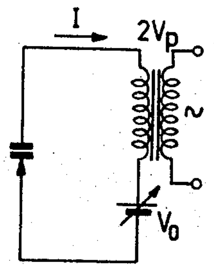
FIGURE 4 shows an elementary varactor circuit fed by a direct voltage and a pump voltage.

In the current circuit of FIGURE 4, the instantaneous current flowing through the varactor is given by the diode equation:

$$I_t=I_o[e^{-a(V_o+2V_p\cos\omega t)}-1] \quad (4)$$

In this formula, $I_o$ represents the saturation current of the diode in the cut-off direction and $$a \text{ is equal to } \frac{q}{mkT} \quad (3)$$

$q$ is equal to the charge of the electron, $k$ represents the Boltzmann constant, T the absolute temperature, $m$ a factor which depends upon the density of the recombination centres and the values of which generally lies between 1 and 1.4; at a normal operating temperature, $a$ may be chosen to be equal to 30 $V^{-1}$.

$I_o$ also depends upon the temperature according to the formula:

$$I_o=i_oe\frac{b}{T} \quad (5)$$

In this formula, $i_o$ represents a constant which is independent of temperature and $b$ a constant depending upon the semiconductor material used (for germanium approximately 8000 and for silicon 1200).

Starting from Formula 4, it is found that the direct current in the circuit:

$$I=I_oe^{-aV_o}J_o(2aV_p)-1 \quad (6)$$

In this formula, $J_o(x)$ represents a Bessel's function of the first order and the first kind:

$$J_o(x)=n=o\frac{(-1)n_x2n}{n.^2}$$

The direct current passing through the diagonal from 1 to 3 in FIGURE 1 whilst $V_s=0$ will then be equal to:

$$I_k=I_{o2}[e^{-a_1V_{o2}}J_o(2a_2V_{q2})-1-I_{o1}e^{-a_1V_{o2}}J_o(2a_1V_{p1})-1] \quad (7)$$

This formula no longer starts from the ideal circuit arrangement having diodes the characteristics of which are accurately equal and fully identical windings 9 and 10, but in this formula:

$I_{o2}$ is the $I_o$ of diode 6, and $I_{o1}$ the $I_o$ of diode 5,
$a_2$ the $a$ of diode 6, and $a_1$ the $a$ of diode 5,
$V_{p2}$ the pump voltage of the secondary 10 and
$V_{p1}$ the pump voltage of the secondary 9.

If $V_{o1}$ is chosen to be equal to $V_{o2}$, due to the fact that $I_{o1}$, $I_{o2}$, $a_1$, $a_2$ and $V_{p1}$, $V_{p1}.I_k$ will not be equal to zero either. Due to the presence of $V_{o1}$ and $V_{o2}$, $I_k$ can be adjusted to zero. For this purpose, a D.C.-meter is connected between the terminals 14 and 15 and one of the voltages $V_{o1}$ or $V_{o2}$ is readjusted until the direct current through the diagonal is equal to zero. Subsequently, the current-measuring device is replaced by the signal source $V_s$. This signal source will have to supply a current $V_s/R_1$. Starting from the Formula 7 in which $V_{o2}$ is replaced by $V_{o2}-V_s$ and $V_{o1}$ by $V_{o1}+V_s$, and considering the fact that $V_{o1}$ and $V_{o2}$ are considerably larger than $V_s$, it is found that the current through the diagonal $$\frac{V_s}{R_i}=[a_2I_{o2}^{-a_2V_{o2}}J_o(2a_2V_{p2})+a_1I_{o1}e^{-a_1V_{o1}}J_o(2a_1V_{p1})]V_s$$

The terms of $V_s/R_1$ are of the same order as the terms of $I_k$ multiplied by $aV_s$. When $a$ is approximately equal to 30 and $V_s$ is of the order of a few microvolts, this results in that each disequilibrium between the two terms of Formula 7 produces and $I_k$ which is not negligible with respect to $V_s/R_1$. Consequently, this equilibrium must be accurately adjusted to $I_k=0$.

However, the temperature and hence $I_{o1}$, $I_{o2}$, $a_1$ and $a_2$ also vary with time. The temperature of each diode may even vary differently. The direct voltages $V_{o1}$ and $V_{o1}$ and the pump voltages $V_{p1}$ and $V_{p2}$ may also vary. The infinitesimal variation of $I_k$ as a function of the infinitesimal variations of the variables resulting in the variation of $I_k$ is given by the differentiation of (7).

$$dI_k=\left[\frac{\delta I_k}{\delta I_{o2}}\frac{dI_{o2}}{dT}-\frac{\delta I_k}{\delta I_{o2}}\frac{dI_{o1}}{dT}+\frac{\delta I_k}{\delta a_2}\frac{da_2}{dT}-\frac{\delta I_k}{\delta a_k}\frac{da_1}{dT}\right]dT+ \frac{\delta I_k}{\delta V_{o2}}dV_{o2}-\frac{\delta I_k}{\delta V_{o1}}dV_{o1}+\frac{\delta I_k}{\delta V_{p2}}dV_{p2}-\frac{\delta I_k}{\delta V_{p1}}dV_{p1} \quad (9)$$

It follows from Formula 7 that:

$$\frac{\delta I_k}{\delta I_{o2}}=e^{-a_2V_{o2}}J_o(2a_2V_{p2})-1 \quad (10)$$

$$\frac{\delta I_k}{\delta I_{o1}}=e^{-a_1V_{o1}}J_o(2a_1V_{p1})-1 \quad (11)$$

$$\frac{\delta I_k}{\delta a_2}=I_{o2}e^{-a_2V_{o2}}[2V_{p2}J_1(2a_2V_p)-V_{o2}J_o(2a_2V_{p2})] \quad (12)$$

In this formula, the function $J_1(x)$ is the derivative to $x$ from $J_o(x)$.

$$\frac{\delta I_k}{\delta a_1}=I_{o1}e^{-a_1V_{o1}}2V_{p1}J_1(2a_1V_{p1})-V_{o1}J_o(2a_1V_{p1}) \quad (13)$$

$$\frac{\delta I_k}{\delta V_{o2}}=-a_2I_{o2}e^{-a_2V_{o2}}J_o(2a_2V_{p2}) \quad (14)$$

$$\frac{\delta I_k}{\delta V_1}=-a_1I_{o1}e^{-a_1V_{o1}}J_o(2a_1V_{p1}) \quad (15)$$

$$\frac{\delta I_k}{\delta V_{p2}}=2a_2I_{o2}e^{-a_2V_{o2}}J_1(2a_2V_{p2}) \quad (16)$$

$$\frac{\delta I_k}{\delta V_{p1}}=2a_1I_{o1}e^{-a_1V_{o1}}J_1(2a_1V_{p1}) \quad (17)$$

If the direct current in one of the loops is adjusted to zero, it is found that (cf. Formula 6)

$$e^{-aV_o}J_o(2aV_p)=1 \quad (18)$$

and values of $V_p$ at which $2aV_p$ is relatively considerably larger than 1 (a usual value is, for example, 30+) may be written as follows:

$$J_o(x)\approx\sqrt{\frac{1}{2\pi x}}e^x$$

As a result (18 is)

$$\frac{V_o}{2V_p}=1-\frac{\ln(4\pi aV_p)}{aV_p}$$

and for the same comparatively large values of $2aV_p$, the formula $$\frac{V_o}{V_p}\approx 2 \text{ or } V_o\approx 2V_p \quad (19)$$

is obtained. Moreover, some of these values may be written as follows:

$$J_o(2aV_p)\approx J_1(2aV_p) \quad (20)$$

and it follows from (19) and (20) that the adjustment of a direct current in a loop results in that $$2V_{p2}J_1(2aV_p)-V_oJ_o(2aV_p)=0 \qquad (21)$$

is obtained.

It follows that (12), (13) and (21) that when the direct current is adjusted to zero $\delta I_k/\delta a_2$ and $\delta I_k/\delta a_2$ become substantially equal to zero. Moreover, it appears from (10), (11) and (18) that $\delta I_k/\delta I_{o2}$ and $\delta I_k/\delta I_{o1}$ become equal to zero.

It is apparent from (9) that $I_k$ no longer fluctuates at varying temperatures of the varactors, since the coefficient of $dT$ in this formula is equal to zero, which results in that Formula 9

$$dI_k=\frac{\delta I_k}{\delta V_{o2}}dV_{o2}+\frac{\delta I_k}{\delta V_{p2}}dV_{p2}-\frac{\delta I_k}{\delta V_{o1}}dV_{o1}-\frac{\delta I_k}{\delta V_{p1}}dV_{p1} \qquad (22)$$

is obtained.

The fluctuations of $I_k$ due to the variations of the polarization- and pump voltages may then further be avoided in that the variable direct voltages $V_{o1}$ and $V_{o2}$ are obtained by conversion and rectification of the alternating voltage which after conversion supplies the pump voltages $V_{p1}$ and $V_{p2}$. This operation may be carried out by means of the circuit arrangement shown in FIGURE 5. In this case, $V_{o1}$ and $V_{o2}$ are derived from potentiometers 24 and 25, respectively. These potentiometers are fed by a rectified and filtered alternating voltage produced at the additional secondaries 26 and 27 of the transformer 22. It can be predicted with certainty that, when the direct current in each loop is adjusted (cf. Formula 19).

$$V_{o1}\approx 2V_{p1} \text{ and } V_{o2}\approx 2V_{p2}$$

The fluctuations of the supply voltage at the primary 11 of transformer 22 will then result in that $$dV_{o1}\approx 2dV_{p1} \text{ and } dV_{o2}\approx 2dV_{p2} \qquad (23)$$

As a result of (14), (15), (16) and (17), Formula 22:

$$dI_k=a_2I_{o2}\,[J_1(2a_2V_{p2})-J_o(2a_2V_{p2})]\,dV_{p2} \\ -a_1I_{o1}\,[J_1(2a_1V_{p1})-J_o(2a_1V_{p1})]\,dV_{p1}$$

is obtained, and as a result of (20), the two coefficients of $dV_{p2}$ and $dV_{p1}$ are substantially equal to zero.

Figure 5:
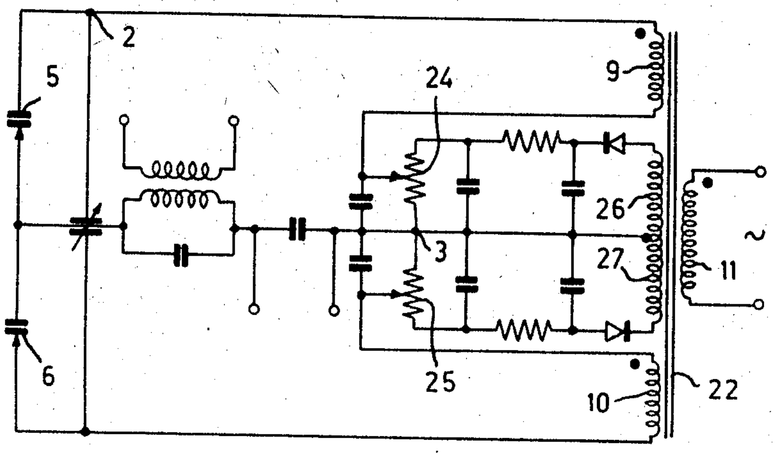
FIGURE 5 shows an improvement upon FIGURE 1.
Figure 6:
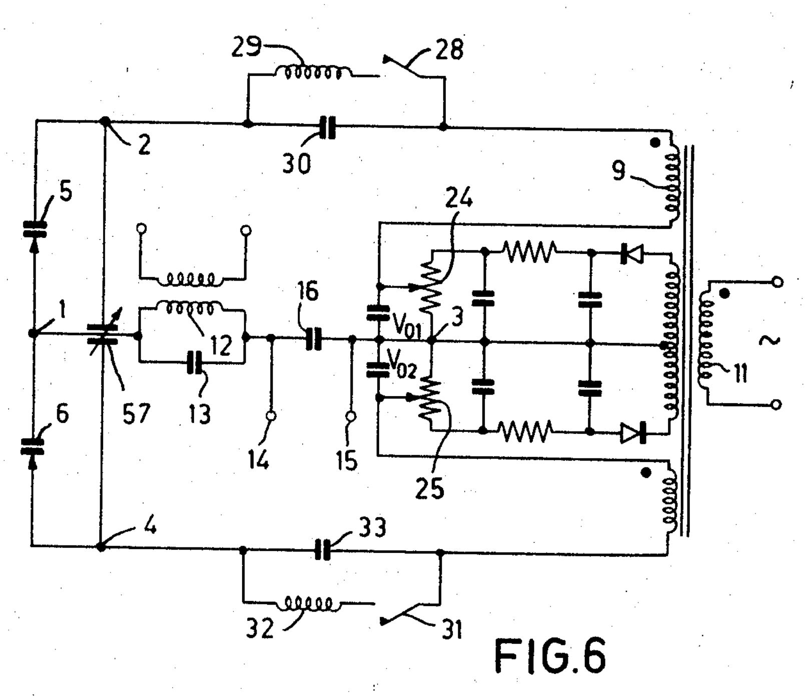
FIGURE 6 shows the circuit arrangement of FIGURE 5, to which the invention was applied.

Therefore, if the direct current in each loop and hence in each varactor is successfully adjusted to zero, the fluctuations of $I_k$ due to temperature fluctuations will certainly be a minimum. If moreover, the variable direct voltages $V_{o1}$ and $V_{o2}$ are obtained by conversion and rectification from the alternating voltage which supplies the pump voltage, the fluctuations of $I_k$ due to the variations of the supply voltage will certainly also be a minimum. However, as already shown, a current-measuring device cannot be connected in a loop. Consequently, other means must be used to check whether the direct current through a varactor is equal to zero. In an embodiment according to the invention, this is achieved in that each loop is provided with an additional circuit arrangement as shown in FIGURE 6. Parts corresponding to those of FIGURES 1 and 5 are designated by the same reference numerals. Each loop further includes a series-combination connected in series with the varactor and comprising a switch 28, an inductance 29 and a capacitor 30 arranged across these two elements. The series-combination in the lower loop comprises a switch 31, an inductance 32 and a capacitor 33.

In the operating position in which a voltage source to be measured is connected to the input terminals 14 and 15, the switches 28 and 31 are closed. In actual fact, the direct current due to the presence of $V_s$ determining the direct voltage across the varactors 5 and 6, respectively, must flow through these switches. The alternating currents invariably flow through the capacitors 30 and 33, respectively, the capacitance of which is very large with respect to that of the varactors. The impedance of 30 and 33 is then negligibly small with respect to that of the varactors. The inductances 29 and 32 have a high impedance with respect to that of the capacitors 30 and 33 so that the alternating current may flow entirely through these capacitors. These inductances may alternatively be replaced by resistors. Thus, it can be seen that the amplifier has been provided with two switches 28 and 31 by which the direct current through an arbitrary varactor can be interrupted. In actual fact, the direct current through varactor 5 is interrupted by opening the switch 28, whilst the direct current through varactor 6 is interrupted by opening the switch 31. In both cases, the direct current in the other varactor is not influenced when the input terminals are short-circuited during the adjustment. When one of the switches is opened, the alternating-current paths do not change either, since in the closed position, substantially no alternating current flows through the switch. Thus, the only condition imposed according to the invention on the additional circuit arrangement is that it must include a number of switches by which the direct current through an arbitrary varactor can be interrupted without the direct currents through the remaining varactors being influenced or the alternating currents in the amplifier being noticeably varied when the input terminals are short-circuited. Thus, for example, the circuit arrangement of FIGURE 7 comprising a capacitor 34, an inductance 35 and a switch 36 also falls within the scope of the invention, since this circuit arrangement provides the possibility of checking whether the direct current through the varactors is actually adjusted to zero, which will now be described more fully.

For $V_s=0$, the direct current through each loop is adjusted to zero in the following manner: $V_s$ is made equal to zero by short-circuiting the input terminals. The direct current in the upper loop is adjusted in the following manner: switch 28 is opened and switch 31 remains closed. The direct voltage in the loop is completely applied to capacitor 30. The varactor 5 does not receive any direct voltage or any direct current so that its capacitance has the value $C_{10}$, i.e. the capacitance value when the direct current through the first varactor is equal to zero. The varactor 6 receives a given direct current and its capacitance value, $C_2$, is not equal to $C_{10}$. As a result, the bridge is in A.C.-disequilibrium and the A.C.-equilibrium is now set by means of a differential capacitor 57. Subsequently, the switch 28 is closed and the A.C.-equilibrium is immediately disturbed again, since the varactor 5 assumes a capacitance value $C_1$ which corresponds to the direct current flowing through it. The A.C.-equilibrium is now reset, but in this case by means of potentiometer 24. When the equilibrium is attained, the capacitance value of varactor 5 has become equal to $C_{10}$ so that no current flows through the varactor. The same applies to the lower loop. The switch 31 is opened, the A.C.-equilibrium is set by means of the differential capacitor 57, the switch 31 is closed and the A.C.-equilibrium is set by means of potentiometer 25. These operations may be repeated several times alternately for the upper and the lower loop.

FIGURE 6 shows an embodiment of the circuit arrangement of FIGURE 5 to which the invention is applied. However, the invention may also be applied to the circuit arrangement of FIGURE 3. The only difference is that in this case, the complementary step of deriving $V_{o1}$ and $V_{o2}$ from the alternating-current source after conversion was dispensed with. Therefore, the direct current in each loop still fluctuates in accordance with the variations of $V_{o1}$, $V_{o2}$ and $V_p$ corresponding to the Formula 22. Thus, the first step of the invention only eliminates the fluctuations due to temperature variations. The complementary step is useful only if the first step has been taken. Therefore, this complementary step is a further feature of the invention.

The sole condition imposed on the variable direct voltage sources $V_{o1}$ and $V_{o2}$ is that separate adjustment is possible without influencing the direct current in the other loop and that the impedances in both loops for the alternating currents are not varied. A correct arrangement can be obtained only if these conditions are fulfilled. The two variable direct voltage sources of FIGURES 3, 5 and 7 satisfy this condition. The source 39 in combination with the potentiometer of FIGURE 8 may be in a position in which the direct current through each individual varactor is equal to zero, it is true, but each variations of the adjustment of source 39 or potentiometer 40 gives rise to a variation of the direct current in each loop. The adjustment then becomes unduly difficult.

Figure 9:
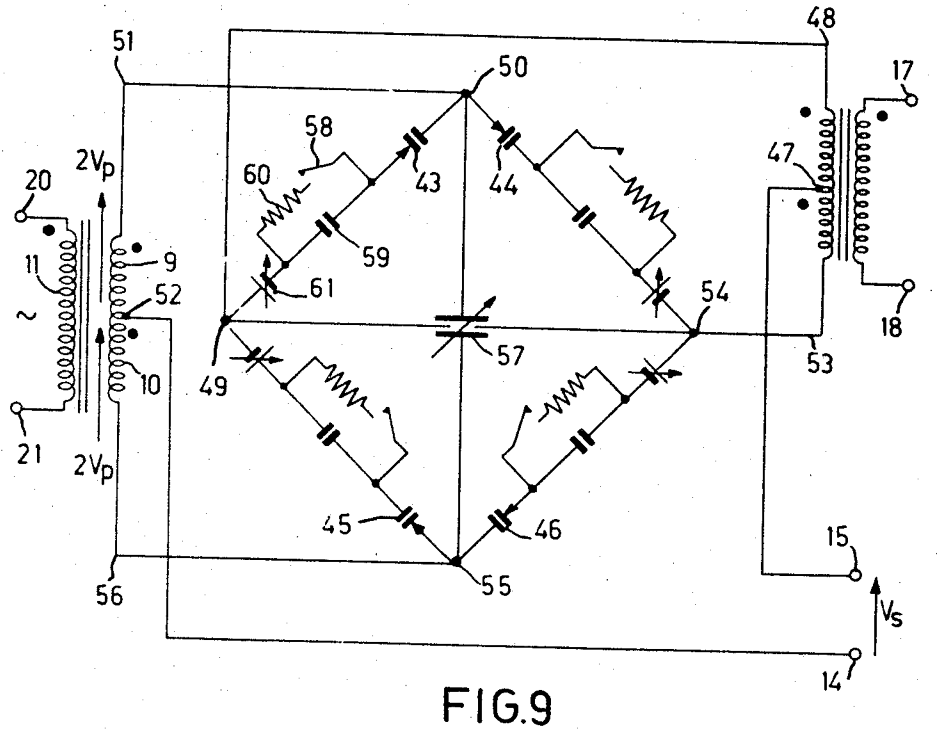
FIGURES 9, 10 and 11 show other embodiments for illustration of the general definition of the structures to which the invention can be applied.
Figure 10:
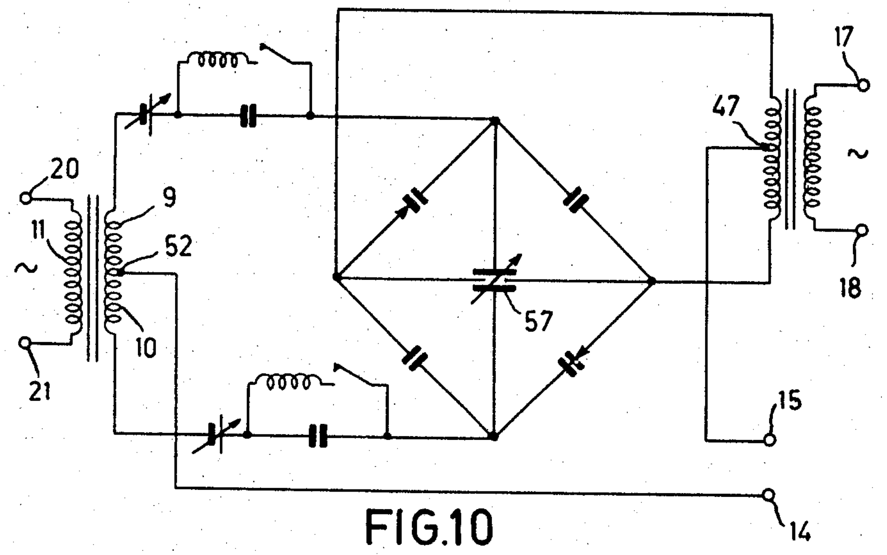
Figure 11:
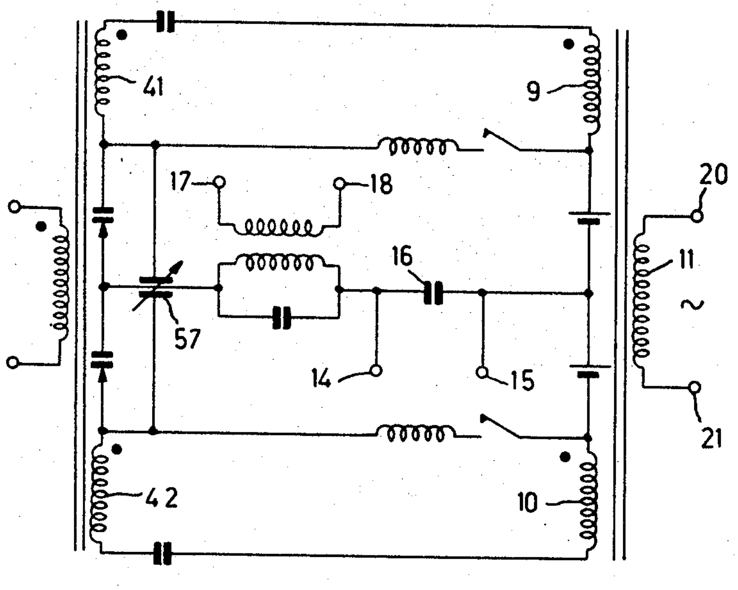

In the description given so far, the invention has been applied to the amplifier of FIGURE 1, but it may also be applied to other parametric amplifiers and in general to the parametric amplifiers comprising varactors in differential arrangement. FIGURES 9, 10 and 11 show a few embodiments of such amplifiers. In all these figures, the input terminals are denoted by 14 and 15 and the output terminals by 17 and 18. The pump signal is applied to the secondaries 9 and 10 through terminals 20 and 21. It should be noted that in FIGURE 11 a second pump signal is applied through the secondaries 41 and 42. This second pump signal has a frequency which is a multiple of the frequency of the pump signal applied through 9 and 10. It can be shown that a larger amount of energy is then available at the output. In all these figures, the invention was applied to parametric amplifiers comprising varactors in differential arrangement.

This differential arrangement of the varactors is obtained as follows. By way of example, FIGURE 9 will be described. The positive polarity of the varactors is chosen to be the pass direction:

(1) All the varactors (43, 44, 45, 46) receive the complete input voltage $V_s$.

43 receives $V_s$ with positive polarity through the path 15–47–48–49–50–51–52–14;
44 receives $V_s$ with negative polarity through the path 15–47–53–54–50–51–52–14;
45 receives $V_s$ with negative polarity through the path 15–47–48–49–55–56–52–14;
46 receives $V_s$ with positive polarity through the path 15–47–53–54–55–56–52–14.

(2) All varactors receive the complete pump voltage $2V_p$.

43 receives $2V_p$ with negative polarity through the path 51–50–49–48–47–15–14–52;
44 receives $2V_p$ with positive polarity through the path 51–50–54–53–47–15–14–52;
45 receives $2V_p$ with negative polarity through the path 52–14–15–47–48–49–55–56;
46 receives $2V_p$ with positive polarity through the path 52–14–15–47–53–54–55–56.

(3) If an alternating voltage $V_p$ should be applied to the output terminals, the varactors would receive this voltage through the transformer as follows:

43 with positive polarity through 48–49–50–51–52–14–15–47;
44 with positive polarity through 47–15–14–52–51–50–54–53;
45 with negative polarity through 48–49–55–56–52–14–15–47;
46 with negative polarity through 47–15–14–52–56–55–54–53.

As a result, the following table is obtained:

| | $V_s$ | $2V_p$ | $V_f$ |
|---|---|---|---|
| 43 | + | − | + |
| 44 | − | + | + |
| 45 | − | − | − |
| 46 | + | + | − |

It should be noted that one half (45 and 46) of the four varactors receives the input signal and the pump signal with one polarity and the other half with the opposite polarity. In one half, $V_f$ is then received with one polarity and in the other half with the opposite polarity. These features are characteristic of the differential arrangement of the varactors in a parametric amplifier and the invention can be applied to all these arrangements. A few varactors may be replaced by capacitors (FIGURE 10).

A given number of control capacitors are then added to this differential arrangement, which capacitors are constructed as far as possible so that the value of all the control capacitors is varied by the adjustment of one button in order to obtain an A.C.-equilibrium at the output. These control capacitors are denoted by reference numeral 57 in FIGURES 9, 10 and 11.

In order that such differential structures may act as parametric amplifiers, conditions are also imposed on the supply of input- and pump signals. It is ensured by including a given number of filters in the circuit arrangement that each signal source does not receive the signals of the other signal sources. Thus, in all the figures, the pump signal source does not receive at the terminals 20 and 21 the signal $V_s$. This direct current signal is not passed on by the transformer. The input signal source likewise does not receive the pump signals at the terminals 14 and 15. In FIGURES 6 and 11, this is achieved by the parallel connection of a decoupling capacitor and in FIGURES 9 and 10 by connecting the input signal source to the centre tappings 47 and 52. The output (terminals 17 and 18) must further satisfy the condition that it is decoupled from the input signal source. The signal $V_s$ is indeed not passed on by the transformer. In certain cases, only given frequencies are permissible at the output. Thus, the undesired frequencies can be suppressed by a filter. In FIGURE 6, the filter used for this purpose is an LC-filter 12–13.

If a number of varactors are arranged in a differential structure the output and the supply of which satisfy the aforementioned conditions, a parametric amplifier is obtained to which the invention can be applied. FIGURES 6, 9, 10 and 11 show only a few examples of such structures.

According to the invention, each embodiment includes a number of variable direct voltage sources and a number of switches. In general, the positions of the switches are determined as follows: when the input terminals are short-circuited, it must be possible to choose freely one varactor from the circuit arrangement and to adjust the switches so that the direct current solely in this varactor is interrupted. This adjustment of the switches must not influence the direct currents originally flowing through the other varactors. The alternating currents flowing through the whole structure must not be varied by this adjustment either.

The arrangement of FIGURE 9 includes four switches which are normally in the closed position. If, for example, the direct current in varactor 43 should be interrupted, it is sufficient to open switch 58. This does not influence the direct current in the remaining three branches of the bridge. The four branches 49–50, 50–54, 54–55 and 55–49 are actually arranged in parallel with a D.C.-short-circuit. Opening of the switch 58 does not influence either the configuration of the alternating currents in the structure which are supplied by the pump voltages. A capacitor 59, the reactance of which is small with respect to that of the impedance 60 (constituted by a coil or a resistor) connected in parallel with this capacitor across the switch 58, invariably ensures that the switch 58 and the resistor 60 are short-circuited for alternating currents at the pump frequency.

Starting from the general considerations for positioning the switches, the positions of the switches and the additional impedances in each parametric amplifier structure can be defined.

In a corresponding manner, the positions of the variable direct voltage sources in each structure can also be defined. When the input terminals are short-circuited and the switches are closed, it must be possible to choose freely a varactor from the circuit arrangement and to adjust the direct current in this varactor to zero. This adjustment must not influence the direct currents flowing through the other varactors. This adjustment must not influence either the alternating currents flowing through the whole arrangement.

For example, the structure of FIGURE 9 includes four variable direct current sources. The switches are normally in the closed position. If, for example, the direct current in varactor 43 should be adjusted to zero, this may be achieved by adjusting to the source 61. This adjustment does not influence the alternating currents in the structure or the direct currents in the remaining three branches of the bridge.

In any arbitrary structure, the direct currents through all varactors are adjusted individually in order of succession. For each varactor, this adjustment is effected in two steps: first the switches are adjusted so that the direct current in the varactor is equal to zero. The alternating voltage detected at the output is adjusted to zero by means of the control capacitors. Subsequently, all the switches are closed and the output signal is readjusted to zero by means of the corresponding variable direct current source.

It is apparent from calculations analogous to those carried out for the structure of FIGURE 1 that the input signal source must supply a current equal to $$I_k+\frac{V_s}{R_i}$$

and that the fluctuations of $I_k$ are rendered substantially independent of the temperature variations by adjusting the direct current through each varactor to zero. It will also be found that the fluctuations due to the variations of the pump voltage and the variable direct voltages can also be avoided if these direct voltages are derived from a potentiometer fed by a rectified voltage which is proportional to the pump voltage.

Figure 7:
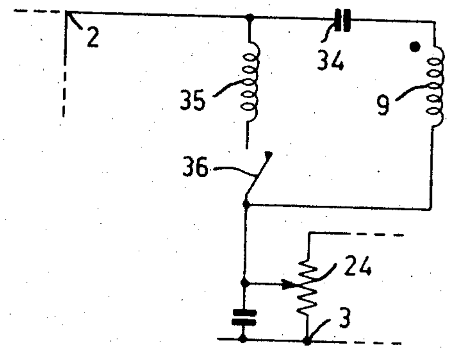
FIGURE 7 shows an alternative embodiment to which the invention can be applied.
Figure 8:
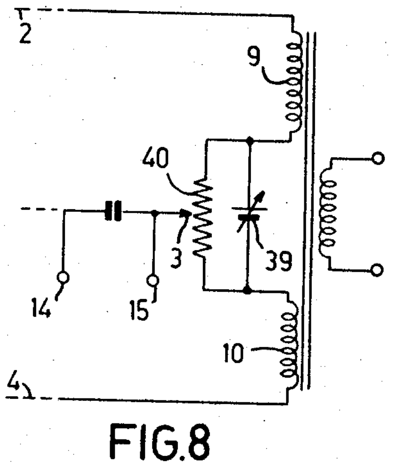
FIGURE 8 shows an embodiment which is not or hardly suitable for use in accordance with the invention.

In the circuit arrangements shown so far, the alternating current in a varactor always flows through a comparatively large capacitor which is connected in series with this varactor (cf. capacitor 30 or 33 in FIGURE 6, capacitor 34 in FIGURE 7). The direct current in the varactor then flows through a high impedance and a switch which are arranged also in series with this varactor, but in parallel with the said large capacitor. This capacitor must be large in order that the alternating current in the varactor may not be noticeably varied when the switch is opened. As a result, the adjustment to zero requires a comparatively long time. In actual fact, when the switch 28 is opened, the direct voltage of the corresponding loop will completely be applied to capacitor 30. Consequently, the A.C.-equilibrium cannot be set before this capacitor has been charged. In the case of a large capacitor, this charging time is long.

Figure 12:
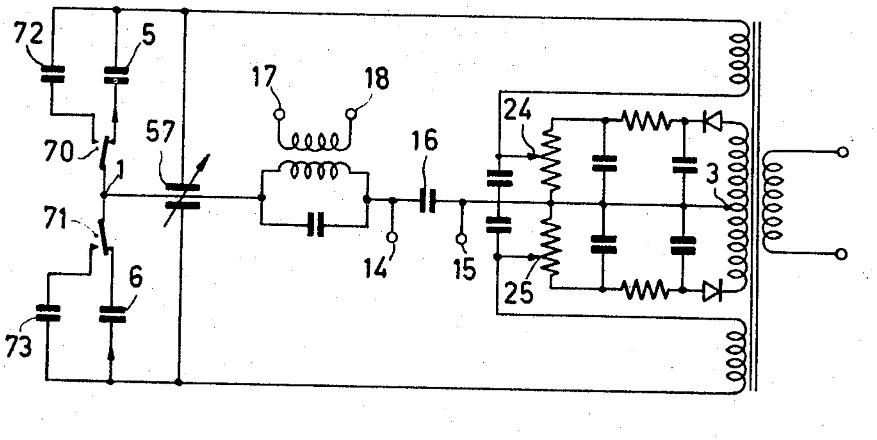
FIGURE 12 shows an alternative embodiment of the invention.

This disadvantage may be obviated by a second kind of arrangement shown in FIGURE 12. This figure also starts from the amplifier of FIGURE 5. The parts corresponding to those of FIGURE 5 or FIGURE 6 are denoted by the same reference numerals. Each varactor 5 and 6 of the circuit arrangement can be replaced with the aid of a corresponding switch 70 and 71, respectively, by a corresponding capacitor 72 and 73, respectively. The sources of variable voltage $V_1$ and $V_2$ are of the same kind and likewise serve to adjust the direct current in the two loops.

The circuit arrangement operates as follows: First the direct current in varactor 5 is adjusted to zero. This adjustment is effected in two steps. In the first step, the varactor 6 in the circuit arrangement is replaced with the aid of switch 71 by capacitor 73 and the input terminals 14 and 15 are left out of circuit. As a result, the direct current in varactor 5 is completely interrupted. Due to the presence of the pump signal at the terminals 11 and due to the fact that the capacitances 5 and 73 are not equal, an A.C.-disequilibrium is obtained which is detected at the output terminals 17 and 18. The equilibrium is set by means of the double adjusting capacitor 57. Subsequently, in the second step, the input terminals 14 and 15 are short-circuited and a direct current normally flows through varactor 5. This is detected in that again an A.C-disequilibrium is obtained at the output 17–18. The adjusting capacitor is left out of circuit and the direct current in the upper loop is varied by means of the potentiometer 24 until the A.C.-equilibrium is obtained at the output. The value of capacitance 5 is then again the same as when the direct current in it was interrupted, that is to say that the direct current in the varactor 5 is also adjusted to zero. The same applies to the varactor 6; the varactor 5 is now replaced with the aid of a switch 71 by capacitor 73, the input 14–15 is again opened, the A.C.-equilibrium is set by means of the double adjusting capacitor 57, the input 14–15 is short-circuited and the resulting disequilibrium is restored with the aid of potentiometer 25. If required, these operations may be repeated several times and finally the circuit arrangement is put in the operative position, in which the switch contacts occupy the positions shown in the figure.

It should be noted that when the input terminals are opened, the adjustment can take place only after the capacitor 16 has been charged. However, this charging time is not long, since the capacitor 16 need not be large. In actual fact, it is not important whether the short-circuiting of the terminals 14–15 gives rise to a variation of the alternating current impedance in the diagonal 1–3, because this variation cannot involve a variation in the A.C.-equilibrium.

The same principle may be applied to the other types of parametric amplifiers having varactors in differential arrangement, as described above.

After the general structures to which the invention can be applied and their features have been described in general terms, it should be noted that several pump voltages of different frequencies can be applied to each varactor. These voltages may be applied through different transformers or through the same transformer, the primary of which is passed by a non-sinusoidal alternating current (for example, a sawtooth current).

The pump signals may be applied to the varactors in the form of voltages, but also in the form of currents through current generators applying an alternating current to the varactors.

In particular, it should be noted that when the adjustment of the direct current in each varactor to zero is effected so that in the first step the value of the direct current passing through the varactor is measured and recorded by the positions of the capacitors. Consequently, the parametric amplifier itself is utilized for this measurement. Thus, a very accurate adjustment can be obtained.

Furthermore, it should be noted that the direct current through each varactor can also be adjusted to zero by other means. Formula 6 gives the quantities $V_o$, $V_p$ and $a$ on which this direct current depends and by means of which this direct current can be adjusted to zero. Hitherto, the $V_o$-adjustment was obtained only by means of the variable direct voltage source. Alternatively, it is possible to adjust to the pump voltage $V_p$ in each loop. For this purpose, the secondaries which supply the pump voltage must be capable of supplying a variable alternating voltage. However, the adjustment is then carried out differently and is less appropriate. A D.C.-meter is connected to the input terminals 14–15 and a switch is opened so that the direct current in one of the varactors is interrupted. The variation of this direct current can be read immediately from the D.C.-meter. This provides an indication as to whether this varactor must receive a higher or a lower pump voltage. The switch is closed immediately and the pump voltage applied to this varactor is then raised or reduced without varying the pump voltages in the other varactors. As a result, however, the A.C.-equilibrium is strongly disturbed and this equilibrium is re-set by means of the differential capacitor 57. Consequently, this capacitor must be comparatively large in this case. This operation is repeated several times until the switch can be opened without the direct current in the diagonal being noticeably varied.

Due to the adjustment to a very small and stable input current, all these parametric amplifiers are particularly suitable for use in an operational amplifier. The direct-voltage signal is then applied to the input of the parametric amplifier. The alternating output voltage may then be amplified by an A.C.-amplifier before it is fed back.

These parametric amplifiers are also very suitable for use in the adjusting amplifiers which amplify the deviation of a signal to be adjusted from a prescribed signal. This deviation signal is applied to the input of such a parametric amplifier and the alternating voltage may serve, as the case may be after being amplified by an A.C.-amplifier, as pump signal.

These amplifiers may also be used for measuring extremely low voltages, currents and resistances or for measuring voltage sources having a high internal resistance, for example, in pH-meters and the like.

What is claimed is:

1. A parametric amplifier comprising varactors in differential arrangement and adjusting capacitors for setting the A.C.-equilibrium at the output, characterized in that the amplifier includes means by which the direct current through an arbitrary varactor can be interrupted without the direct current through the remaining varactors being influenced or the A.C.-paths in the amplifier being noticeably varied when the input terminals are short-circuited, and in that the amplifier further includes means by which, when no direct current at all is interrupted by the former means, the direct current through each individual varactor can be adjusted to zero without the direct currents through the remaining varactors being influenced or the A.C.-paths in the amplifier being noticeably varied when the input terminals are short-circuited.

2. A method of reducing the fluctuations about the zero value of that part of the input current to be applied to a parametric amplifier as claimed in claim 1 which is independent of the input voltage, characterized in that before the use, when the input terminals are short-circuited and pump signals are applied, the direct currents through all the varactors are individually adjusted to zero in order of succession, which adjustment is carried out for each varactor in two steps, in the first step only the direct current through the relevent varactor being interrupted by the former means, whereupon the output signal is adjusted to zero by means of the adjusting capacitors, whilst in the second step no direct current at all is interrupted by the former means, whereupon the output signal is readjusted to zero by the latter means.

3. A parametric amplifier as claimed in claim 1, characterized in that the current-supply lead to each varactor in the amplifier includes a branch which can be passed only by an alternating current and which is connected in parallel with a branch which has a high impedance with respect to that of the first branch and which can only pass the direct current to the relevant varactor, which latter branch includes a switch by which the current flowing through it can be interrupted..

4. A parametric amplifier as claimed in claim 1 characterized in that the current-supply lead to each varactor in the amplifier, in one branch of which the direct current can only pass through this varactor, includes a variable voltages source by which the direct current in this varactor can be adjusted to zero.

5. A parametric amplifier as claimed in claim 4, characterized in that each adjustable direct current source comprises a potentiometer fed by a direct voltage which is derived from the pump signals by conversion and rectification.

6. A parametric amplifier having varactors in differential arrangement and adjusting capacitors for setting the A.C.-equilibrium at the output, characterized in that the amplifier includes means by which an arbitrary varactor in the circuit arrangement can be replaced by a capacitor having a constant and substantially equal capacitance value without the direct currents in the remaining varactors being influenced or the A.C.-paths in these varactors being noticeably varied when the input terminals are short-circuited, and in that the amplifier further includes one or more variable voltage sources by which the direct current through each varactor can be adjusted to zero when all the remaining varactors have been replaced by the corresponding capacitors with the aid of the former means.

7. A method of reducing the fluctuations about the zero value of that part of the input current to be applied to a parametric amplifier as claimed in claim 5 which is independent of the input voltage, characterized in that before the use and when pump signals are applied, the direct currents through all the varactors are individually adjusted to zero in order of succession, which adjustment is carried out for each varactor in two steps, in the first step all the remaining varactors being replaced with the aid of the former means by a corresponding capacitor, whereupon the output signal is adjusted to zero by the adjusting capacitors when the input terminals are opened, whilst in the second step the input terminals are short-circuited and the output signal is readjusted to zero by the said voltage source or sources.

8. In a parametric amplifier of the type having a plurality of differentially connected varactors, variable capacitor means for setting the A.C. equilibrium in the amplifier, an input circuit for applying imput signals to said amplifiers and means for applying direct voltages to said varactors, the improvement wherein said amplifier further comprises means for selectively interrupting direct currents in said varactors whereby direct current flow in the remaining varactors and alternating currents in said amplifier are unaffected when said input circuit is short circuited, and wherein said means for applying direct voltages comprises means for selectively controlling direct currents applied to said varactors.

No references cited.

ROY LAKE, *Primary Examiner.*

D. R. HOSTETTER, *Assistant Examiner.*

U.S. Cl. X.R.

330—4.9. 7. 9